(12) United States Patent
Qian et al.

(10) Patent No.: US 10,898,781 B2
(45) Date of Patent: Jan. 26, 2021

(54) AUTOMATIC BALL LAUNCHER FOR PETS

(71) Applicant: Xiaomin Qian, Guangdong (CN)

(72) Inventors: Xiaomin Qian, Guangdong (CN);
Shengye Ding, Guangdong (CN)

(73) Assignee: Xiaomin Qian, Shenzhen (CN)

( * ) Notice: Subject to any disclaimer, the term of this patent is extended or adjusted under 35 U.S.C. 154(b) by 0 days.

(21) Appl. No.: 15/666,460

(22) Filed: Aug. 1, 2017

(65) Prior Publication Data

US 2017/0326428 A1  Nov. 16, 2017

(30) Foreign Application Priority Data

Feb. 28, 2017  (CN) .................... 2017 2 0191673 U
Jul. 3, 2017  (CN) .......................... 2017 1 0531402

(51) Int. Cl.
| | | |
|---|---|---|
| *F41B 4/00* | (2006.01) | |
| *A63B 69/40* | (2006.01) | |
| *A01K 15/02* | (2006.01) | |
| *A63B 71/06* | (2006.01) | |

(52) U.S. Cl.
CPC .......... *A63B 69/406* (2013.01); *A01K 15/025* (2013.01); *A63B 2071/0683* (2013.01); *A63B 2071/0694* (2013.01); *A63B 2208/14* (2013.01); *F41B 4/00* (2013.01)

(58) Field of Classification Search
CPC ..... A63B 69/406; A63B 69/40; A63B 69/407; A63B 69/408; A63B 69/409; F41B 4/00
USPC ......................................................... 124/78
See application file for complete search history.

(56) References Cited

U.S. PATENT DOCUMENTS

| | | | |
|---|---|---|---|
| 2,716,973 A * | 9/1955 | Desi ..................... | A63B 69/406 |
| | | | 124/78 |
| 3,511,225 A | 5/1970 | Yokoi | |
| 3,611,996 A | 10/1971 | Wegner et al. | |
| 4,094,294 A | 6/1978 | Speer et al. | |
| 4,185,608 A | 1/1980 | Young et al. | |
| 4,209,003 A * | 6/1980 | Sainsbury ............ | A63B 69/408 |
| | | | 124/41.1 |
| 4,237,851 A | 12/1980 | Haller | |
| 4,267,799 A | 5/1981 | Bacon | |
| 4,323,047 A * | 4/1982 | McIntosh ............. | A63B 69/406 |
| | | | 124/1 |
| 4,368,885 A | 1/1983 | Katada et al. | |

(Continued)

FOREIGN PATENT DOCUMENTS

WO       2013134262 A1    9/2013

*Primary Examiner* — John E Simms, Jr.
(74) *Attorney, Agent, or Firm* — Rimon PC

(57) ABSTRACT

An automatic ball launcher for pets includes a body shell, a ball launch aisle, a ball launch mechanism which is connected to the ball launch aisle and near the outlet for the ball; the ball launch mechanism comprises one or more ball launch wheels and one or more ball launch motors; the ball launch wheels are set on two sides of the ball launch aisle, a face of which is a concaved curve; the concaved curve matches the outline of the ball; regular teeth are arranged on the concaved curve; the ball launch wheels are driven by one or more ball launch motor and launch the ball from the outlet. The present invention effectively enlarged the contact surface between the wheels and the ball, which solve the problem of slippery ball being stuck inside the launcher. The playing is not interrupted by the stuck ball and is enjoyable.

14 Claims, 7 Drawing Sheets

(56) References Cited

U.S. PATENT DOCUMENTS

| | | | | |
|---|---|---|---|---|
| 4,611,571 | A * | 9/1986 | Tressler | A63B 69/408 124/7 |
| 4,721,091 | A | 1/1988 | Ridley et al. | |
| 4,823,763 | A * | 4/1989 | Ponza | A63B 69/406 124/1 |
| 4,834,060 | A * | 5/1989 | Greene | A63B 69/406 124/78 |
| 4,995,374 | A | 2/1991 | Black | |
| 5,170,650 | A * | 12/1992 | Kortenbrede | E05B 67/003 70/386 |
| 5,265,583 | A | 11/1993 | Otto | |
| 5,574,582 | A | 11/1996 | Takeda et al. | |
| 5,749,797 | A | 5/1998 | Sunseri et al. | |
| 5,776,018 | A * | 7/1998 | Simpson | A63B 24/0021 473/433 |
| 6,176,230 | B1 | 1/2001 | Thompson | |
| 6,190,271 | B1 | 2/2001 | Rappaport et al. | |
| 6,772,745 | B2 | 8/2004 | McEachen et al. | |
| 6,817,351 | B2 | 11/2004 | Keller et al. | |
| 6,843,241 | B1 | 1/2005 | Newcomer | |
| 6,875,136 | B2 | 4/2005 | Leal et al. | |
| 7,114,465 | B1 | 10/2006 | Winter | |
| 7,263,953 | B2 | 9/2007 | Sundararajan | |
| 7,278,934 | B2 | 10/2007 | McBride | |
| 7,328,671 | B2 | 2/2008 | Kates | |
| 7,334,541 | B2 | 2/2008 | Reiter | |
| 8,225,750 | B2 | 7/2012 | Newman | |
| 8,522,725 | B1 | 9/2013 | Moore | |
| 8,550,063 | B2 | 10/2013 | Alger | |
| 8,807,089 | B2 | 8/2014 | Brown et al. | |
| 8,944,006 | B2 | 2/2015 | Anderson et al. | |
| 8,997,727 | B1 * | 4/2015 | Hamel | F41B 7/08 124/10 |
| 9,022,016 | B1 | 5/2015 | Hafer et al. | |
| 9,320,960 | B1 | 4/2016 | Ward | |
| 2002/0082125 | A1 * | 6/2002 | Markin | A63B 69/406 473/451 |
| 2003/0125139 | A1 * | 7/2003 | Gottlieb-Myers | A63B 69/0002 473/451 |
| 2004/0261778 | A1 * | 12/2004 | Wilmot | A63B 69/406 124/78 |
| 2006/0236993 | A1 * | 10/2006 | Cucjen | A63B 69/406 124/78 |
| 2009/0095273 | A1 * | 4/2009 | Paulson | A63B 69/0002 124/78 |
| 2011/0303208 | A1 | 12/2011 | Taylor | |
| 2013/0104869 | A1 * | 5/2013 | Lewis | G09B 19/0038 124/78 |
| 2013/0228138 | A1 * | 9/2013 | Hamill | A01K 15/025 119/707 |
| 2014/0109887 | A1 | 4/2014 | Edson | |
| 2016/0262351 | A1 * | 9/2016 | Hamill | A01K 15/025 |
| 2017/0095716 | A1 * | 4/2017 | Lewis | A63B 69/40 |
| 2017/0252630 | A1 * | 9/2017 | Tomlinson | A63B 69/406 |
| 2017/0326414 | A1 * | 11/2017 | York | A63B 63/08 |

* cited by examiner

AUTOMATIC BALL LAUNCHER FOR PETS

CROSS REFERENCE OF RELATED APPLICATION

This application claims priority under 35 U.S.C. 119(a-d) to CN201720191673.9, filed Feb. 28, 2017 and CN201710531402.8, filed Jul. 3, 2017.

BACKGROUND OF THE PRESENT INVENTION

Field of Invention

The present invention relates to the pet toy field, and more particularly to an automatic ball launcher for pets.

Description of Related Arts

More and more people feed cats or dogs in the house in China and in European and American countries. With the development of the society, people are crowded in the city and the private area for each people is further reduced, so the space for pet is limited. Favorite pet toys which are able to draw the attention of the pets appear in the market. A lot of research is carried out in the pet toy field and simple pet toys are no longer able to meet the needs of people. A series of pet toys which are able to improve the intelligence of the pets while playing are being developed by people to integrate the playing with the intelligence cultivation of the pets, such as an automatic tennis ball launcher for pets While the pet dog plays with the automatic ball launcher, because the dog fetches the ball in the mouth, the ball tends to be contaminated by the saliva and dust. The ball is frequently stuck in the ball aisle and the launch distance is reduced. The ball is easily stuck in the aisle if the ball is contaminated by saliva and is wet, which is unpleasant during the playing between the owner and the pet.

Conventionally, the ball launch wheels of the automatic ball launcher for pets are cylinders with flat teeth. Although gears are set around the ball launch wheels, the contact surface of the wheel and the ball is small and the ball is easily slipping away or stuck in the launcher due to the abrasion or contamination of the wheel face by the saliva.

Chinese application 201380022590.1 (PCT/US2013/029124) publics a pet exercise and entertainment devices which comprises a launch funnel for launching projectiles for a pet to retrieve. The launch funnel has a feeder and a chute. The feeder is configured to receive a projectile and transport the projectile to an intake end of the chute. A sensor is configured to sense the projectile in the intake end of the chute and to command one or more motors to power up in response to sensing the projectile. An actuator is configured to release the projectile from the intake end of the chute into the launch end of the chute after a pre-determined time has elapsed. One or more wheels, rotated by the one or more motors, are configured to launch the projectile from the launch end of the chute. The contact surface of the wheels and the ball is small. The abrasion of the surface due to long time use and the saliva on the ball cause the ball slipping away or being stuck in the launcher, which is not enjoyable.

SUMMARY OF THE PRESENT INVENTION

An object of the present invention is to provide an automatic ball launcher for pets. The contact surface of the wheel and the ball is enlarged effectively, which solves the problem of stuck ball due to saliva. The present invention is enjoyable and is able to keep launching the ball while playing.

The present invention provides an automatic ball launcher for pets, comprising:

a body shell, wherein an entrance for a ball at is a top end and an outlet for a ball at a front end;

a ball launch aisle which is settled between the entrance for the ball and the outlet for the ball to connect the entrance for the ball and the outlet for the ball;

a ball launch mechanism which is connected to the ball launch aisle and near the outlet for the ball; the ball launch mechanism comprises one or more ball launch wheels and one or more ball launch motors; the ball launch wheels are settled at two sides of the ball launch aisle; a face of the ball launch wheels is a concaved curve which matches an outline of the ball; the ball launch wheels rotate to launch the ball from the outlet, which are driven by the one or more ball launch motors.

Furthermore, the present invention provides the automatic ball launcher for pets, wherein the concaved curve is formed by regularly arranged teeth.

Furthermore, the present invention provides the automatic ball launcher for pets, wherein the ball launch wheels comprise a wheel core and a rubber wheel; the wheel core and the rubber wheel are fixed together by fastener or are integrally molded.

Furthermore, the present invention provides the automatic ball launcher for pets, wherein the wheel core comprises a bearing, a silicone case with bulges which is worn on the bearing, a bottom shell which matches the silicone case.

Furthermore, the present invention provides the automatic ball launcher for pets, wherein a ball fender is set on one side of the ball launch aisle near the entrance for the ball.

Furthermore, the present invention provides the automatic ball launcher for pets, wherein the ball fender comprises one or more blades and a micro switch; a first through-hole is cut on the side of the ball launch aisle for the blades to pass.

Furthermore, the present invention provides the automatic ball launcher for pets, wherein a sensor is set on one side of the ball launch aisle, wherein the sensor is connected to the ball launch mechanism; the sensor is for sensing the ball and sending out signals to the ball launch mechanism.

Furthermore, the present invention provides the automatic ball launcher for pets, wherein the sensor is an electronic switch or mechanical switch; preferably, a Hall switch is selected.

Furthermore, the present invention provides the automatic ball launcher for pets, wherein the automatic ball launcher for pets comprises a ball conveyor and a ball conveyor motor for driving the ball conveyor; the ball conveyor is driven by the ball conveyor motor to send the ball into the ball launch mechanism.

Furthermore, the present invention provides the automatic ball launcher for pets, wherein the ball conveyor comprises one or more blades; wherein a second through hole is cut on a side of the ball launch aisle for the blades to move back and forth.

Furthermore, the present invention provides the automatic ball launcher for pets, wherein a sound proof pad is placed on a ball falling point in the ball launch aisle when the ball falling down from the entrance Furthermore, the present invention provides the automatic ball launcher for pets, wherein the ball launch aisle between the ball falling point and the ball launch wheels is tilted; preferably, the angle between the tilted aisle and the horizontal plane is bigger than 30°.

Furthermore, the present invention provides the automatic ball launcher for pets, comprising a control device.

Furthermore, the present invention provides the automatic ball launcher for pets, wherein the control device comprises a control module built inside the body shell, a control panel and a remote control device set outside the body shell; the remote control device adopts a wireless remote control.

Furthermore, the present invention provides the automatic ball launcher for pets, wherein the control device is connected to the sensor, the ball launch device, the ball fender or the ball conveyor respectively; the sensor checks ball signals and transmits the signals to the control device; the control device sends commands to start the motor of the ball launch mechanism and sends commands to open the ball fender or start the ball conveyor after the pre-set time period passed.

Furthermore, the present invention provides the automatic ball launcher for pets, wherein the control device is able to control the speed of the motor to adjust the launch distance of the ball according to the user setting.

Furthermore, the present invention provides the automatic ball launcher for pets, wherein the pre-set time period refers to the time period required for the launch motor running to the pre-set speed; the pre-set speed refers to the launch speed of the launch wheel set by the control device.

Furthermore, the present invention provides the automatic ball launcher for pets which comprises a human body sensor, wherein the human body sensor is connected to the control device.

Furthermore, the present invention provides the automatic ball launcher for pets, wherein a USB interface is set at the front end of the body shell for connection to the human body sensor; the human body sensor is connected to the control device through the USB interface.

Furthermore, the present invention provides the automatic ball launcher for pets wherein an angle rotator is set on the bottom of the body shell, wherein the angle rotator is connected to the control device.

Furthermore, the present invention provides the automatic ball launcher for pets, wherein an angle converter, a drive wheel and a driven wheel which is behind the drive wheel are set at the bottom of the body shell; wherein the drive wheel is connected to the wheel motor; the angle converter and the wheel motor are connected to the control device.

Furthermore, the present invention provides the automatic ball launcher for pets, wherein the control panel comprises button for a launch range selection, launch range indicators, a remote control sensor light, a launch indicator or button for launch speed.

Furthermore, the present invention provides the automatic ball launcher for pets, wherein a ball storage tank is set in the body shell.

Furthermore, the present invention provides the automatic ball launcher for pets which comprises a power interface and a power switch.

Furthermore, the present invention provides the automatic ball launcher for pets, wherein the power interface, a battery set and a power switch are all connected to the control device.

Furthermore, the present invention provides a ball launcher for pets, wherein handles are set on the left and the right side of the body shell.

Furthermore, the present invention provides a ball launcher for pets, wherein the entrance for ball in the body shell is in a basket shape with an outlet at the bottom, which is integrate and nice in appearance; the body shell of the ball launch aisle and the ball launch mechanism part is divided into the left and right part which are able to be integrated and convenient for assembly in the production procedure.

Furthermore, the present invention provides an automatic ball launcher for pets, wherein the ball is a tennis ball, a rubber ball, an EVA ball and etc., which has good abrasion and bite endurance and is easy to clean.

Furthermore, the present invention provides an automatic ball launcher for pets, wherein the ball launch motor links with a synchronized drive belt pulley through an axle; the synchronized drive belt pulley links with a synchronized driven belt pulley through a belt; the synchronized driven belt links with the ball launch wheel through a bearing.

Furthermore, the present invention provides an automatic ball launcher for pets, wherein the synchronized drive belt pulley and the synchronized driven pulley are on the same level.

On the other hand, the present invention provides a working method of the automatic ball launcher for pets which comprises steps of:

sending a ball into the ball launch aisle from an entrance; detecting the ball and transmitting signals to a control device by a sensor; starting a ball launch mechanism by the control device;

starting a ball conveyor motor to drive a ball conveyor to send the ball into a ball launch mechanism after a preset time period passed; and launching the ball from an outlet after being accelerated by ball launch wheels in the ball launch mechanism; wherein a face of the ball launch wheels is a concaved curve which matches an outline of the ball; the ball launch wheels are driven by one or more ball launch motors.

Furthermore, a ball launch aisle between the ball conveyor and the ball launch wheels is tilted; the preset time period refers to a period required for the ball launch motor of the ball launch mechanism running to a preset speed; the preset speed refers to a launch speed of the ball launch wheels set by a control device.

Compared to the conventional technology, the present invention has the below benefits.

1) The present invention provides the automatic ball launcher for pets, wherein the face of the ball launch wheels is the concaved curve which matches the ball outline; regular teeth are arranged on the concaved curve to prevent slippery; the contact surface of the ball and the ball launch wheels is increased; the problem of saliva contaminated ball easily being stuck in the ball launcher is solved; the launch distance and stability of the launcher is guaranteed; the pet training efficiency is improved. Besides, with the special ball launch wheel face design, more types of balls are able to be used, such as an EVA ball.

2) The ball launch wheels adopt the rubber wheel to wrap the wheel core by integral molding or by fasteners, which is able to effectively reduce the weight of the launch wheel; on the other hand, a silicon case with bulges is worn on the wheel core to prevent the bearing outer ring from rotating and effectively reduce the noise and shake, which extends the service life of the ball launch motor of the ball launch wheels.

3) A human body sensor is adopted to increase the safety factor while the people is playing with the pet; wherein the sensor is connected through the USB interface, which is convenient for switching on and off. Handles are set on the two sides of the body shell for transport.

4) The control device adjusts the launch speed, launch direction and launch distance of the automatic ball launcher to increase the fun in playing.

5) The ball fender, the micro switch and the sensor are adopted; while switch on, the ball is blocked by the blades of the ball fender when the ball enters the launch aisle from the entrance; the sensor checks the ball signals and sends out signals; the control device receives the signals and starts launch motor of the ball launch mechanism; the ball launch motor of the ball launch mechanism rotates for a pre-set time period (the ball launch wheels reach a pre-set speed); the control device starts the ball fender to rotates; the ball falls down and rolls to the outlet under gravity; the ball is launched out from the outlet by two highly rotating ball launch wheels; the ball fender rotates; when any one of the blades of the ball fender touches the micro switch, the ball fender stops and the blade is in a fending status; Another ball enters the ball launch aisle from the entrance; repeat the procedure.

6) The ball conveyor, the ball conveyor motor and the sensor are adopted; when switch on, the ball enters the ball launch aisle from the entrance; the sensor checks the ball signals and sends out signals; the control device receives signals and starts the ball launch motor of the ball launch mechanism; the ball falls down to the bottom of the ball launch aisle under gravity; the ball launch motor of the ball launch mechanism rotates for a pre-set time period (the ball launch wheels reach the pre-set speed); the control device starts the ball conveyor motor to drive the ball conveyor; the ball conveyor conveys the ball to the highly rotating ball launch wheels; the ball launch wheels launch the ball from the outlet; another ball enters the ball launch aisle from the entrance and falls down to the ball launch point; repeat the procedure.

7) A sound proof pad is adopted to reduce the shock and noise when the ball falls down to the falling point; if the sensor does not receive signals for a long time, the control device stops the automatic ball launcher for energy saving.

8) The ball launch aisle between the ball falling point and the ball launch wheels is tilted; preferably the angle of the slope is bigger than 30° which effectively confines the falling point when the ball falls down to the bottom of the ball launch aisle and prevents the ball from entering the ball launch wheels directly; the limit device adopts the slope to effectively prevent the ball from being stuck in the ball launcher.

9) An angle rotator is adopted, which is able to selectively move and rotate; the direction and position of the automatic ball launcher is thus controlled through the remote control to increase fun in playing.

Figure 1:
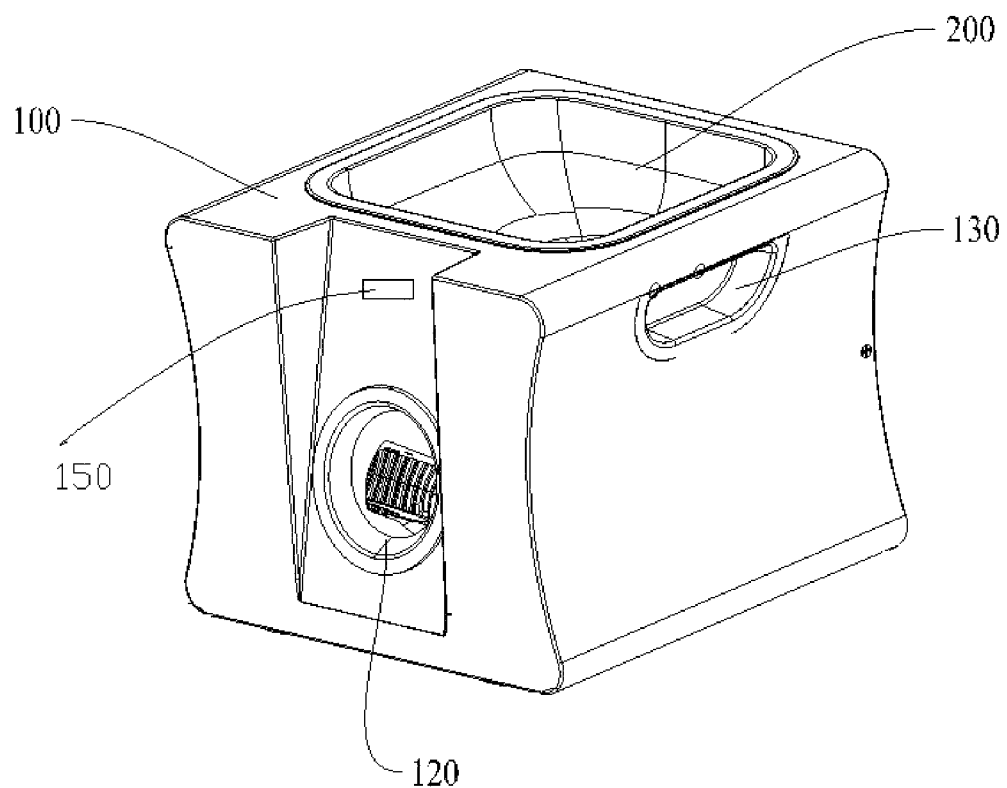
FIG. 1 is a perspective view of a structure of an automatic ball launcher for pets of a present invention in a first angle.

Element numbers: body shell 100; entrance for a ball 110; outlet for a ball 120; handle 130; human body sensor 150; ball storage basket 200; ball launch aisle 300; first through-hole 310; ball launch mechanism 400; ball launch motor 401; ball launch wheels 410; wheel core 411; rubber wheel 412; bearing 4111; silicone case 4112; bottom shell 4113; ball conveyor 420; ball falling point 421; control device 500; control panel 510; button 511 for launch range selection; launch range indicators 512; remote control sensor light 513; ball fender 600; blades 610; micro switch 620; sensor 700; ball storage tank 800; tank door 810; power interface 900A; battery set 900B; power switch 900C.

DETAILED DESCRIPTION OF THE PREFERRED EMBODIMENT

According to preferred embodiments of the present invention is illustrated. The present invention is not limited by the below embodiments. Preferred embodiments are illustrated by the drawings while the automatic ball launcher for pets is able to be realized in many other forms. The embodiments are provided to thoroughly explain the present invention of the automatic ball launcher for pets, which are not limitations for the present invention.

In the descriptions, the terminologies such as "longitudinal", "transverse", "up", "down", "front", "back", "left", "right", "vertical", "horizontal", "top", "bottom", "inside" and "outside" are based on the drawings and are simplified descriptions of the direction and position in the drawing to describe the present invention, which are not indications or hints for specific positions, directions, structures and operations of the device or components. The terminologies are not limitations for the present invention. Besides, words such as "first", "second" and "third" are just for distinguish not an indication or hint for the relative importance.

In the descriptions of the specification, the terminologies such "an embodiment", "some embodiments", "example", "specific examples" or "some example" means that the described features, structures, materials or characters are enclosed in at least one of the embodiments of the present invention. In the specifications, the terminologies are not confined within the same embodiment or example. The described specific features, structures, materials or characters are able to be combined in a suitable way in one or more of the embodiments.

In the present invention, unless specified otherwise, the terminologies such as "assemble", "connect", "join" are general words which refer to mechanical connection, electrical connection or internal linkage. The words may refer to direct connection or connection through a media. The understanding of the words depends on specific situations for a skilled technician.

Embodiment 1

Refers to drawing 1, 2 and 5, the present invention provides an automatic ball launcher for pets which comprises:

a body shell 100, wherein an entrance for a ball 110 is at a top end and an outlet for a ball 120 at a front end of the body shell 100; wherein a diameter of the entrance for the ball 110 is slightly bigger than the diameter of the ball, which allows the ball to fall down to the ball launch aisle 300 and be launched out through the ball launch mechanism 400 one by one; the ball is able to be a tennis ball, an EVA ball and etc.; wherein the EVA ball has the following advantages compared to the tennis ball: the EVA ball with a surface without fibers has better bite, impact endurance and bounce, is easy to clean and less harmful for people and pets who carelessly hit by the ball.

a ball launch aisle 300 which is settled between the entrance for the ball 110 and the outlet for the ball 120 to connect the entrance for the ball 110 and the outlet for the ball 120; the ball stored in the ball storage basket 200 enters the ball launch aisle 300 through the entrance for the ball 100 and is launched out from the outlet for the ball 120 through the ball launch aisle 300;

a ball launch mechanism 400 which is connected to the ball launch aisle 300 and near the outlet for the ball 120; the ball launch mechanism 400 comprises one or more ball launch wheels 410 which are set on two sides of the ball launch aisle 300; a face of the ball launch wheels 410 is a concaved curve which matches an outline of the ball; the surface of the ball launch wheels 410 is arranged with regular teeth; the ball launch wheels 410 rotate to launch the ball from the outlet 120, which are driven by the one or more ball launch motors 401.

For convenient explanation, two ball launch wheels are illustrated for successive description; the two ball launch wheels 410 are set on the two sides of the ball launch aisle 300 respectively; the distance between the two ball launch wheels 410 is slightly smaller than the diameter of the ball; the size, shape and structure of the two ball launch wheels are same; the two ball launch wheels are set symmetrically on the two sides of the ball launch aisle 300; the distance between the two ball launch wheels 410 is slightly smaller than the diameter of the ball which enables the two ball launch wheels 410 to squeeze and launch out the ball when the ball enters the ball launch aisle and rolls to between the two ball launch wheels 410.

The above description illustrates that the face of the ball launch wheels 410 at the left and right sides of the ball launch aisle 300 is a concaved curve which matches the outline of the ball; the design significantly increases the contact surface between the ball and the ball launch wheels 410, which effectively solves the problem of saliva contaminated ball being easily stuck inside the ball launcher and guaranteed the launch distance and stability of the ball; the pet training efficiency is improved effectively.

Preferably, the automatic ball launcher for pets of the embodiment of the present invention comprises a ball storage basket 200; the ball storage basket 200 is integrated on the top of the body shell 100 and connected to the entrance for ball 110; the ball storage basket 200 is for storing the ball such as tennis balls; the ball storage basket 200 is set above the entrance for the ball 110 to form a symmetrical funnel; the ball storage basket adopts the integral molding which is pressed on the machine core and is able to be assembled and disassembled easily; the appearance of the ball launcher is integral, which enhances the water-proof feature.

Figure 3:
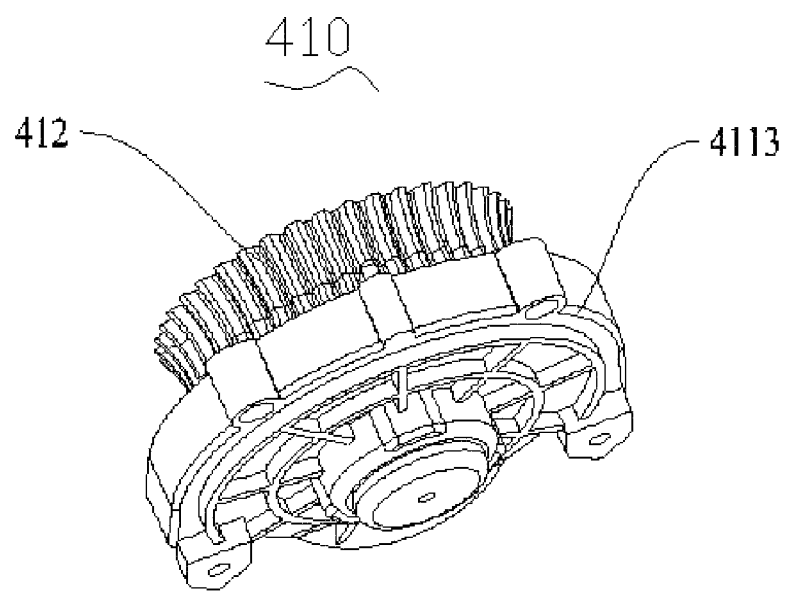
FIG. 3 is a perspective view of the structure of the automatic ball launcher for pets of the present invention.
Figure 4:
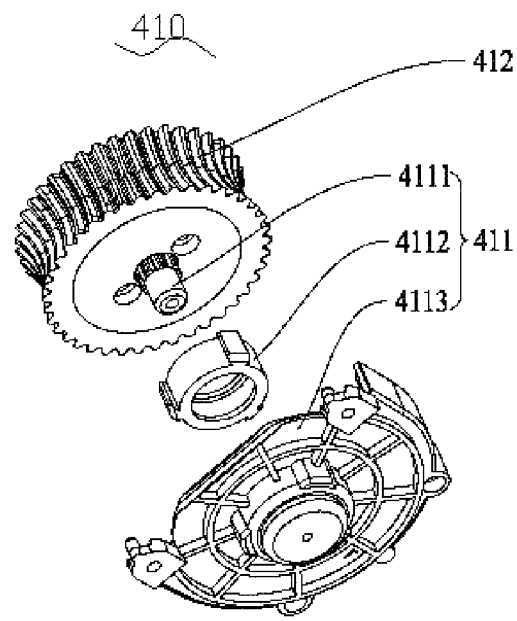
FIG. 4 is an exploded view of the automatic ball launcher for pets of the present invention.

Preferably, as in the FIG. 3 and FIG. 4, the ball launch wheels 410 comprise the wheel core 411 and the rubber wheel 412.

The one of the ball launch wheels 410 of the embodiment of the present invention comprises a wheel core 411 and a rubber wheel 412; the wheel core 411 and the rubber wheel 412 are fixed together by fasteners or are integrally molded; the weight of the wheel is controlled by the rubber wheel 412 which effectively reduces the weight of the ball launch wheels 410.

As illustrated in FIG. 4, wheel core 411 comprises a bearing 4111, a silicone case 4112 with bulges which is worn on the bearing, a bottom shell 4113 which matches the silicone case 4113; a slot is set on the bottom shell 4113, which matches the silicone case 4112 with bulges; the silicone case 4112 is fixed in the bottom shell 4113.

A silicon case 4112 with bulges is worn on the bearing 4111 of the wheel core 411 to prevent the bearing 4111 outer ring from rotating and effectively reduce the noise and shake, which extends the service life of the ball launch motor of the ball launch wheels 410.

Figure 6:
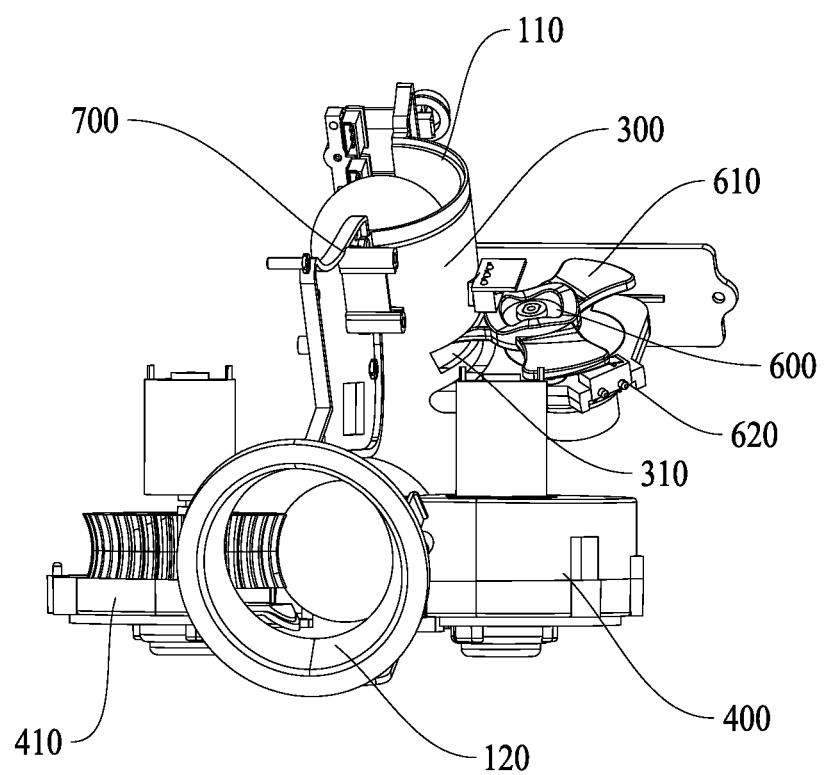
FIG. 6 is another local structure of the automatic ball launcher for pets in embodiment 1.

Preferably, as shown in the FIG. 6, the automatic ball launcher for pets of the embodiment comprises the ball fender 600 which is set on one side of the ball launch aisle 300 and near the entrance for the ball 110; the ball fender 600 comprises one or more blades 610 and the micro switch 620; the number of the blades 610 is able to be 2 pcs or 3 pcs; the ball fender 600 rotates until any one of the blades 610 touches the micro switch 620; the ball fender 600 stops and the blade 610 which touches the micro switch is in a fending status.

A first through-hole 310 is cut on the side of the ball launch aisle 300 for the blades 610 to pass; the ball fender 600 is connected to the control device 500.

Preferably, as illustrated in FIG. 6, a sensor 700 is set on one side of the ball launch aisle 300, wherein the sensor 700 (a Hall switch is set on the side of the ball launch aisle 300 with the outlet for ball) (not marked in the drawing) is electrically connected to the ball launch mechanism 400; the sensor 700 is for sending out signals to start the ball launch mechanism 400.

While switch on, the ball is blocked by the blades 610 of the ball fender 600 when the ball enters the launch aisle 300 from the entrance 110; the sensor 700 checks the ball and sends out signals to starts the ball launch motor 401 of the ball launch mechanism 400; the ball launch motor of the ball launch mechanism rotates for a pre-set time period (the ball launch wheels reach a pre-set speed); the ball fender 600 receives the signals and rotates; the ball falls down and rolls to the outlet under gravity; the ball is launched out from the outlet 120 by two highly rotating ball launch wheels 410; the ball fender 600 rotates; when any one of the blades 610 touches the micro switch 620, the ball fender 600 stops and the blade is in a fending status; Another ball enters the ball launch aisle 300 from the entrance 110; repeat the procedure.

Figure 2:
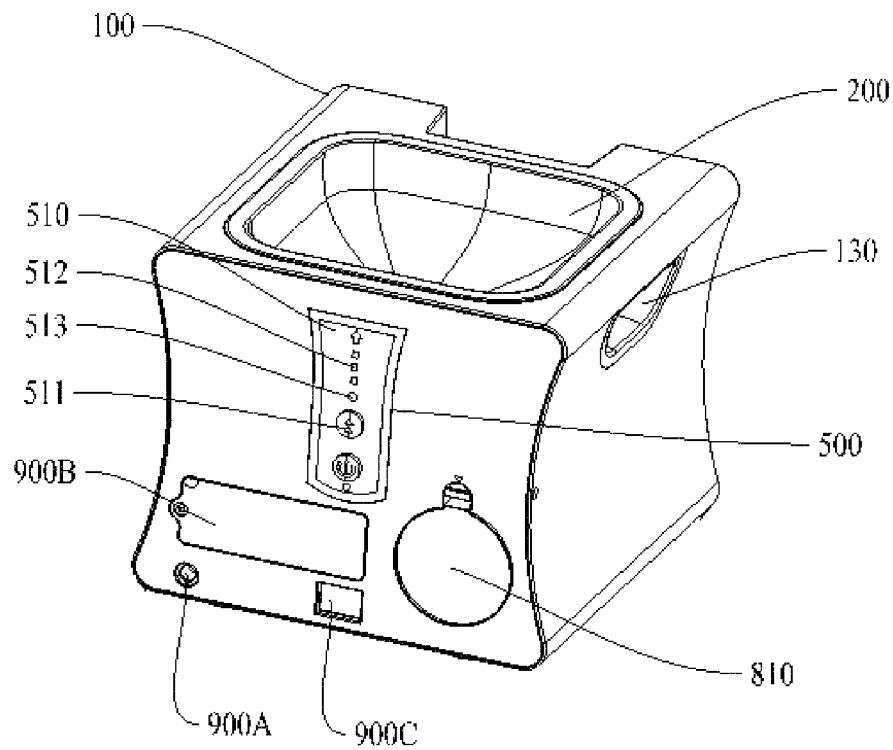
FIG. 2 is a perspective view of the structure of the automatic ball launcher for pets of the present invention in a second angle.

Preferably, as shown in the FIG. 2, the automatic ball launcher for pets in the embodiment comprises the control device 500; the sensor 700, the ball launch mechanism 400, the ball fender 600 which are connected to the control device 500 respectively; the control device 500 receives the signals from the sensor 700 and controls the speed of the ball launch motor 401; the control device 500 receives the signals from the sensor 700 and starts the ball fender 600 after the pre-set time period passed; after the ball fender 600 is started, the ball falls into the ball launch aisle 300 and enters the ball launch mechanism 400 for launching; the control device 500 is also for adjusting the launch time and the launch speed of the ball launch mechanism 400; the pre-set time period refers to the time needed for the ball launch motor 401 running to the pre-set speed; the pre-set speed refers to the launch speed of the ball launch wheels 410 set by the control device 500.

In the embodiment, the control device 500 comprises a control module built inside the body shell, a control panel 510 and a remote control device set outside the body shell 100 (not marked in the drawings).

The remote control device adopts a wireless infrared remote control, a wireless wifi remote control or a blue tooth remote control, which is able to be substituted with an intelligent mobile terminal such as a mobile phone or an ipad for convenient operation. The remote control device enables a remote operation on the automatic ball launcher for switch on and off while the user is training the pet; the automatic ball launcher for pets is able to be operated by using a remote control device at home or in the training field to switch on/off, control the launch time or launch distance of the ball.

Preferably, the control panel 510 comprises button 511 for a launch range selection, launch range indicators 512, a remote control sensor light 513, a launch indicator or button for launch speed.

The launch distance is the distance between the falling point and the ball launcher after the ball is being launched from the ball launcher. The button 511 for a launch range selection is set by a program to enable the user to select a needed launch distance range. The corresponding launch range indicators 512 is lit and at the same time the rotating speed of the launch motor 401 of the launch mechanism 400 is controlled to launch the ball to the needed launch distance.

The button 511 for a launch range selection is able to be real button or touch button.

The user is able to adjust the launch distance of the ball through the remote control device or the control panel 510. When the user uses the remote control device, the remote control sensor light 513 is lit; the remote control device sends out commands; the control module receives commands to control the rotation speed of the ball launch motor of the ball launch mechanism 400; the launch distance is adjusted.

Figure 5:
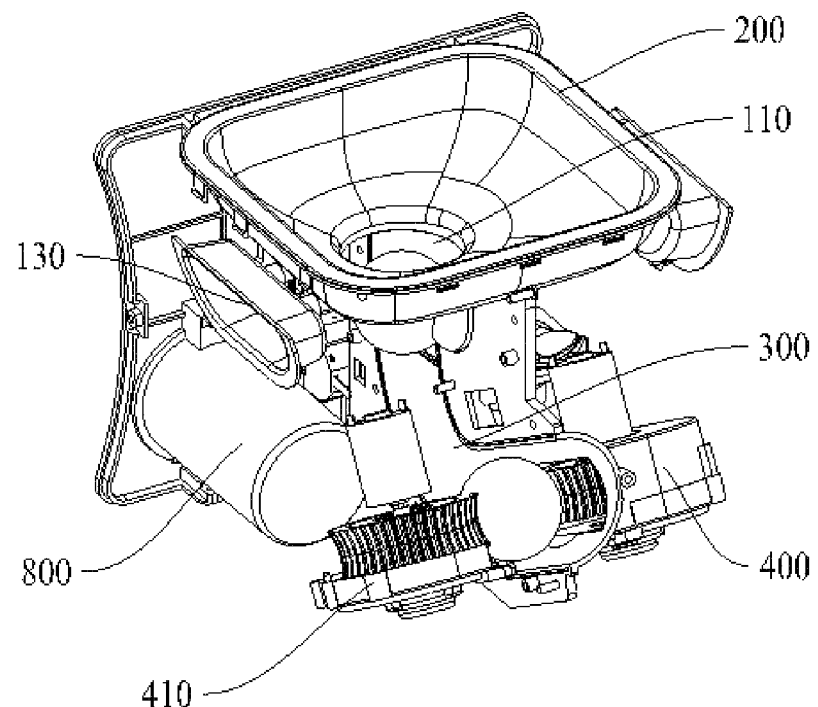
FIG. 5 is a local structure of the automatic ball launcher for pets in embodiments 1, 3 and 4.

Preferably, as in FIG. 2 and FIG. 5, the automatic ball launcher for pets in the embodiment comprises a ball storage tank 800 set in the body shell 100; the tank door 810 of the ball storage tank 800 is on the back of the body shell 100.

The ball storage tank 800 is for storing the ball. When the automatic ball launcher is no longer used, the balls is able to be stored inside the ball storage tank 800 with the tank door 810 closed to prevent the ball from missing. When the ball launcher is in use, the balls are able to be taken out from the ball storage tank 800 for the user and the pet to play.

Preferably, the automatic ball launcher for pets in the embodiment also comprises the power interface 900A, the battery set and the power switch. The power interface 900A, the battery set 900B and the power switch 900C are all electrically connected with the control device 500.

The automatic ball launcher for pets in the embodiment is able to use the external power supply such as the alternating current through the power interface 900A or use the built-in battery set 900B directly. The battery is able to be a storage battery or a chargeable Li-ion battery. The number of the battery is able to be one or many and the type of the battery depends on practical needs.

Preferably, the automatic ball launcher for pets in the embodiment comprises a human body sensor 150 on the front end of the body shell. The human body sensor 150 is connected to the control device.

While the automatic ball launcher is working, if the pet or the user runs into the front of the ball launcher, the human body sensor 150 senses the signals and sends signals to the control device. The control device controls the ball fender to defer the launching or stop launching. The ball launch motor 401 of the ball launch mechanism 400 slows down or stops the rotation. The safe factor of the playing is guaranteed. Preferably, the human body sensor is able to be connected to the ball launcher through the USB interface and is able to be switch on/off arbitrarily, which is convenient for use.

Preferably, as shown in the FIG. 1 and FIG. 2, handles 130 are set on the left and right side of the body shell 100 in the embodiment. An angle rotator (not marked in the drawings) is set on the bottom of the body shell 100. The angle rotator is connected to the control device 500. The signals are input through the control panel 510 or the remote control device. The entrance for the ball 110 on the body shell 100 is in a basket shape with an outlet on the bottom, which is able to guarantee the integrity and good appearance. The body shell on the ball launch aisle 300 and the ball launch mechanism 400 part is divided into the left and the right part and is able to be integrated, which is convenient for assembly.

The automatic ball launcher for pets of the present invention set handles 130 on the left and right side of the body shell 100 for transport. An angle rotator is set on the bottom of the body shell 100. The user is able to adjust the rotating direction and angle of the angle rotator through the remote control device or the control panel 510 to adjust the launch direction and the launch angle of the automatic ball launcher. When the user uses the remote control device, the remote control sensor light is lit and the remote control device sends out the commands. The control device receives the commands and controls the angle rotator to rotate, which is able to control the rotating angle of the automatic launcher. The automatic ball launcher is able to be moved freely without much time and effort needed.

Embodiment 2

Figure 7:
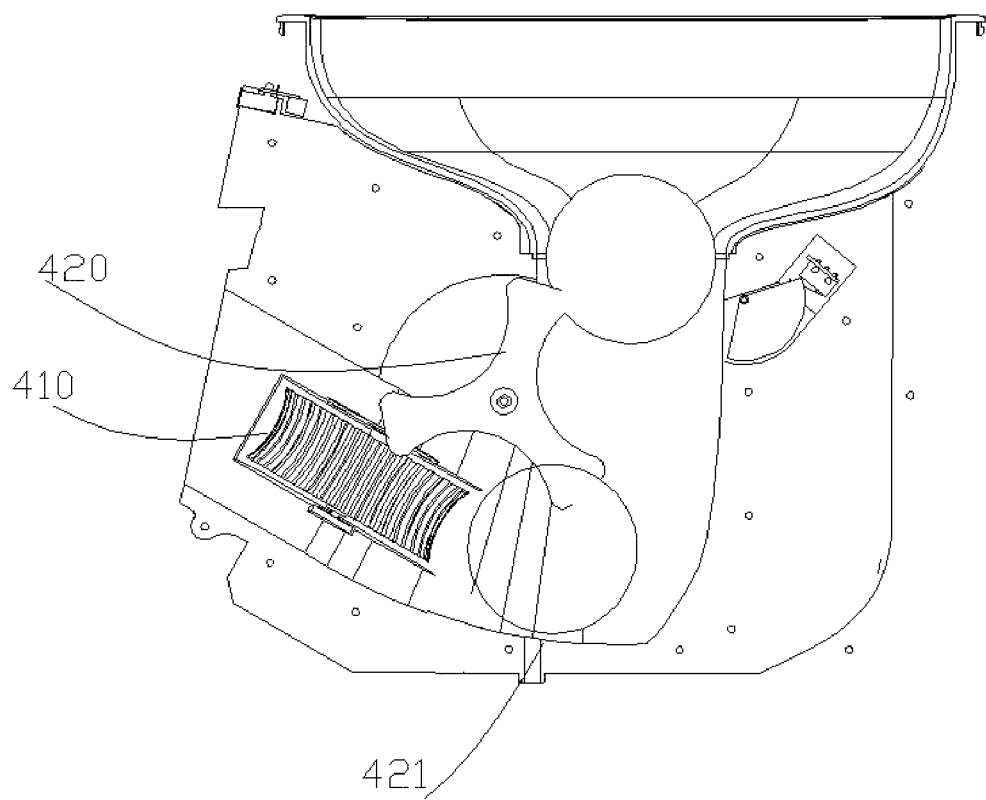
FIG. 7 is a local structure of the automatic ball launcher for pets in embodiment 2.

Referring to the FIG. 1, FIG. 2 and FIG. 7, the automatic ball launcher for pets comprises:

a body shell 100, wherein an entrance for a ball 110 at a top end and an outlet for a ball 120 at a front end of the body shell 100; wherein a diameter of the entrance for the ball 110 is slightly bigger than the diameter of the ball, which allows the ball to fall down to the ball launch aisle 300 and be launched out through the ball launch mechanism 400 one by one; the ball is able to be a tennis ball, an EVA ball and etc., wherein the EVA ball has the following advantages compared to the tennis ball: the EVA ball with a surface without fibers has better bite, impact endurance and bounce, is easy to clean and less harmful for people and pets who carelessly hit by the ball.

a ball launch aisle 300 which is settled between the entrance for the ball 110 and the outlet for the ball 120 to connect the entrance for the ball 110 and the outlet for the ball 120; the ball stored in the ball storage basket 200 enters the ball launch aisle 300 through the entrance for the ball 110 and is launched out from the outlet for the ball 120 through the ball launch aisle 300;

a ball launch mechanism 400 which is connected to the ball launch aisle 300 and near the outlet for the ball 120; the ball launch mechanism 400 comprises one or more ball launch wheels 410 which are set on two sides of the ball launch aisle 300; a face of the ball launch wheels 410 is a concaved curve which matches an outline of the ball; the surface of the ball launch wheels 410 is arranged with regular teeth; the ball launch wheels 410 rotate to launch the ball from the outlet 120, which are driven by the one or more ball launch motors 401.

For convenient explanation, two ball launch wheels are illustrated for successive description; the two ball launch wheels 410 are set on the two sides of the ball launch aisle respectively; the distance between the two ball launch wheels 410 is slightly smaller than the diameter of the ball; the size, shape and structure of the two ball launch wheels are same; the two ball launch wheels are set symmetrically on the two sides of the ball launch aisle 300; the distance between the two ball launch wheels 410 is slightly smaller than the diameter of the ball which enables the two ball launch wheels 410 to squeeze and launch out the ball when the ball enters the ball launch aisle and rolls to between the two ball launch wheels 410.

The above description illustrates that the face of the ball launch wheels 410 at the left and right sides of the ball launch aisle 300 is a concaved curve which matches the outline of the ball; the design significantly increases the contact surface between the ball and the ball launch wheels 410, which effectively solves the problem of saliva contaminated ball being easily stuck inside the ball launcher and guaranteed the launch distance and stability of the ball; the pet training efficiency is improved effectively.

Preferably, the automatic ball launcher for pets of the embodiment of the present invention comprises a ball storage basket 200; the ball storage basket 200 is integrated on the top of the body shell 100 and connected to the entrance for ball 110; the ball storage basket 200 is for storing the ball such as tennis balls; the ball storage basket 200 is set above the entrance for the ball 110 to form a symmetrical funnel; the ball storage basket adopts the integral molding which is pressed on the machine core and is able to be assembled and disassembled easily; the appearance of the ball launcher is integral, which enhances the water-proof feature.

Preferably, as in the FIG. 3 and FIG. 4, the ball launch wheels 410 comprise the wheel core 411 and the rubber wheel 412.

The ball launch wheels 410 of the embodiment of the present invention comprise a wheel core 411 and a rubber wheel 412; the wheel core 411 and the rubber wheel 412 are fixed together by fasteners or are integrally molded; the weight of the wheel is controlled by the rubber wheel 412 which effectively reduces the weight of the ball launch wheels 410.

As illustrated in FIG. 4, wheel core 411 comprises a bearing 4111, a silicone case 4112 with bulges which is worn on the bearing, a bottom shell 4113 which matches the silicone case 4113; a slot is set on the bottom shell 4113, which matches the silicone case 4112 with bulges; the silicone case 4112 is fixed in the bottom shell 4113.

A silicon case 4112 with bulges is worn on the bearing 4111 of the wheel core 411 to prevent the bearing 4111 outer ring from rotating and effectively reduce the noise and shake, which extends the service life of the ball launch motor 401 of the ball launch wheels 410.

Preferably, a sensor 700 is set on one side of the ball launch aisle 300, wherein the sensor 700 (a Hall switch is set on the side of the ball launch aisle 300 with the outlet for ball) (not marked in the drawing) is electrically connected to the ball launch mechanism 400; the sensor 700 is for sending out signals to start the ball launch mechanism 400.

Preferably, the automatic ball launcher for pets comprises a ball conveyor 420 and a ball conveyor motor to drive the ball conveyor 420 moving back and forth. The ball conveyor 420 pushes the ball to the ball launch wheels 410, which is driven by the ball conveyor motor.

Preferably, the ball conveyor 420 is set on one side of the ball launch aisle 300 and near the outlet for the ball 120. A second through hole (not marked in the drawing) is opened on the side of the ball launch aisle 300 for the ball conveyor to move back and forth. The ball conveyor motor drives the ball conveyor 420 moving back and forth to push the ball near to the outlet for the ball 120. The ball is launched out from the outlet for the ball 120 by the launch wheel 410. As shown in the FIG. 7, the structure of the ball conveyor 420 is similar to the ball fender 600 in the FIG. 6. The ball conveyor 420 is set vertically in the ball launcher to fend and push the ball. The ball conveyor 420 comprises one or more blades which are driven by the ball conveyor motor to fend or push the ball. The ball conveyor 420 may comprises an elastic pushing pole which is driven by the ball conveyor motor to push the ball. The ball conveyor is able to be set in other way.

Preferably, a sound-proof buffer is set at the ball falling point 421 in the ball launch aisle 300 to catch the ball falling in the entrance 110 to reduce the shake.

While switch on, the sensor 700 checks the ball when the ball falls into the ball launch aisle 300 from the entrance 110; the sensor 700 sends out the signals and starts the ball launch motor 401 of the ball launch mechanism 400 to rotate; the ball falls down to the bottom of the ball launch aisle 300 (the ball falling point 421) under gravity; when the ball launch motor 401 of the ball launch mechanism 400 drives the ball launch wheels to rotate for a certain time period (or to reach a set speed), the ball conveyor motor is started to drive the ball conveyor 420 to push the ball into the highly rotating ball launch wheels 410; the ball is launched out from the outlet 120 through the ball launch wheels 410; another ball falls down to the ball launch aisle 300 from the entrance 110 and hits the ball falling point 421; repeat the procedure.

Preferably, the ball launch aisle 300 between the ball falling point 421 and the ball launch wheels 410 is tilted with an angle bigger than 30°; the ball launch aisle 300 is a slope inside with a high end near the outlet 120, which guarantees the ball stays at the ball falling point. The slope with an angle over 30° prevents the slippery ball being stuck inside the ball launcher.

Preferably, as shown in the FIG. 2, the automatic ball launcher for pets in the embodiment comprises the control device 500; the sensor 700, the ball launch mechanism 400, the ball conveyor motor which are connected to the control device 500 respectively; the control device 500 receives the signals from the sensor 700 and sends commands to adjust the rotating speed of the ball launch mechanism 400; when the rotating speed reaches a certain value or after the ball launch mechanism rotates for a certain time period, the control mechanism 500 starts the ball conveyor motor to drive the ball conveyor 420 which pushes the ball into the highly rotating ball launch wheels 410; the ball launch wheels 410 launch the ball from the outlet 120.

The ball launch aisle 300 between the ball falling point 421 and the ball launch wheels 410 is a slope with an angle bigger than 30° which prevents the ball from falling into the ball launch wheels 410 directly and being stuck into the ball launcher. The ball is confined at the ball falling point 421, which is pushed into the ball launch wheels 410 by the ball conveyor 420. With the slope and the sound proof pad, the noise and the shake are reduced and the ball is prevented from being stuck in the ball launcher.

In the embodiment, the control device 500 comprises a control module built inside the body shell, a control panel 510 and a remote control device set outside the body shell 100 (not marked in the drawings).

The remote control device adopts a wireless infrared remote control, a wireless wifi remote control or a blue tooth remote control, which is able to be substituted with an intelligent mobile terminal such as a mobile phone or an ipad for convenient operation. The remote control device enables a remote operation on the automatic ball launcher for switch on and off while the user is training the pet; the automatic ball launcher for pets is able to be operated by using a remote control device at home or in the training field to switch on/off, control the launch time or launch distance of the ball.

Preferably, the control panel 510 comprises button 511 for a launch range selection, launch range indicators 512, a remote control sensor light 513, a launch indicator or button for launch speed.

The launch distance is the distance between the falling point and the ball launcher after the ball is being launched from the ball launcher. The button 511 for a launch range selection is set by a program to enable the user to select a needed launch distance range. The corresponding launch range indicators 512 is lit and at the same time the rotating speed of the launch motor 401 of the launch mechanism 400 is controlled to launch the ball to the needed launch distance.

The button 511 for a launch range selection is able to be real button or touch button.

The user is able to adjust the launch distance of the ball through the remote control device or the control panel 510. When the user uses the remote control device, the remote control sensor light 513 is lit; the remote control device sends out commands; the control module receives commands to control the rotation speed of the ball launch motor of the ball launch mechanism 400; the launch distance is adjusted.

Preferably, as in FIG. 2, the automatic ball launcher for pets in the embodiment comprises a ball storage tank 800 set in the body shell 100; the tank door 810 of the ball storage tank 800 is on the back of the body shell 100.

The ball storage tank 800 is for storing the ball. When the automatic ball launcher is no longer used, the balls is able to be stored inside the ball storage tank 800 with the tank door 810 closed to prevent the ball from missing. When the ball launcher is in use, the balls are able to be taken out from the ball storage tank 800 for the user and the pet to play.

Preferably, the automatic ball launcher for pets in the embodiment also comprises the power interface 900A, the power switch 900C and/or the battery set 900B and the power switch 900C. The power interface 900A, the battery set 900B and the power switch 900C are all electrically connected with the control device 500.

The automatic ball launcher for pets in the embodiment is able to use the external power supply such as the alternating current through the power interface 900A or use the built-in battery set 900B directly. The battery is able to be a storage battery or a chargeable Li-ion battery. The number of the battery is able to be one or many and the type of the battery depends on practical needs.

Preferably, the automatic ball launcher for pets in the embodiment comprises a human body sensor 150 on the front end of the body shell. The human body sensor 150 is connected to the control device 500.

While the automatic ball launcher is working, if the pet or the user runs into the front of the ball launcher, the human body sensor 150 senses the signals and sends signals to the control device. The control device 500 controls the ball conveyor motor of the ball conveyor 420 to defer or stop working. The ball launch motor 401 of the ball launch mechanism 400 slows down or stops the rotation. The safe factor of the playing is guaranteed. Preferably, the human body sensor is able to be connected to the ball launcher through the USB interface and is able to be switch on/off arbitrarily, which is convenient for use.

Preferably, as shown in the FIG. 1 and FIG. 2, handles 130 are set on the left and right side of the body shell 100 in the embodiment. An angle rotator (not marked in the drawings) is set on the bottom of the body shell 100. The angle rotator is connected to the control device 500. The signals are input through the control panel 510 or the remote control device. The entrance for the ball 110 on the body shell 100 is in a basket shape with an outlet on the bottom, which is able to guarantee the integrity and good appearance. The body shell on the ball launch aisle 300 and the ball launch mechanism 400 part is divided into the left and the right part and is able to be integrated, which is convenient for assembly.

The automatic ball launcher for pets of the present invention set handles 130 on the left and right side of the body shell 100 for transport. An angle rotator is set on the bottom of the body shell 100. The user is able to adjust the rotating direction and angle of the angle rotator through the remote control device or the control panel 510 to adjust the launch direction and the launch angle of the automatic ball launcher. When the user uses the remote control device, the remote control sensor light 513 is lit and the remote control device sends out the commands. The control device receives the commands and controls the angle rotator to rotate, which is able to control the rotating angle of the automatic launcher. The automatic ball launcher is able to be moved freely without much time and effort needed.

Embodiment 3

Figure 8:
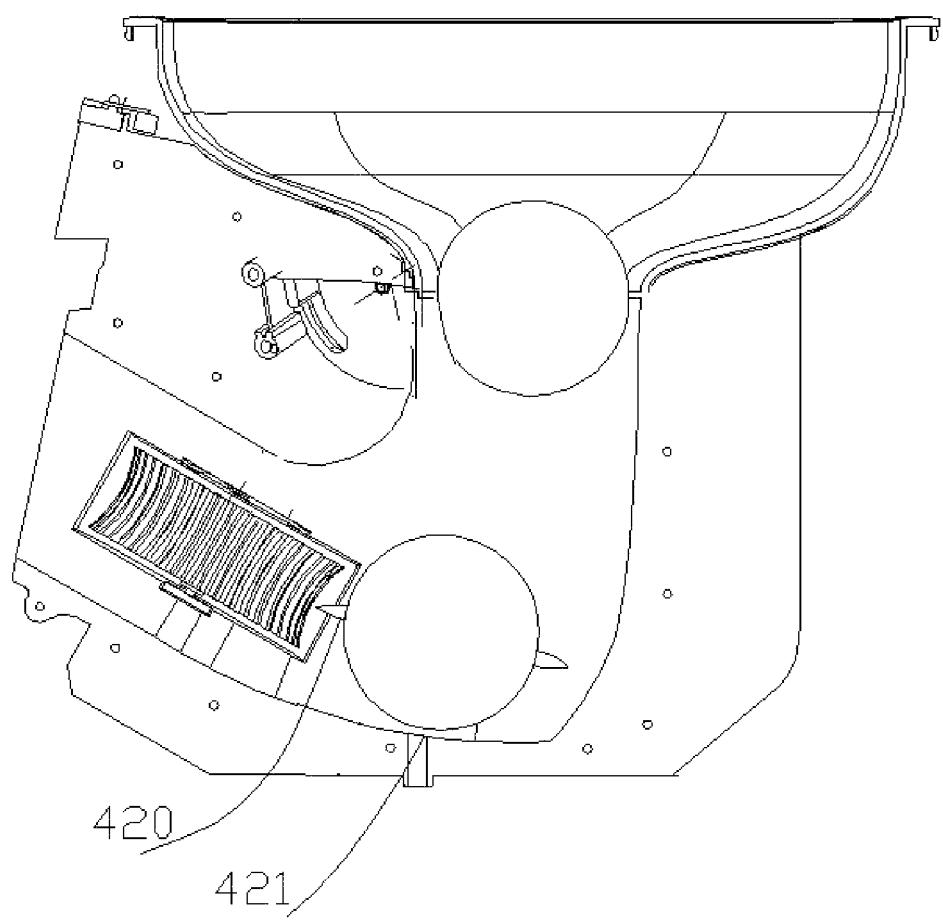
FIG. 8 is a local structure of the automatic ball launcher for pets in embodiment 3.

The present invention provides an automatic ball launcher for pets. Referring to the FIG. 1, FIG. 2 and FIG. 8, the difference between the embodiment 2 and embodiment 3 is that the ball conveyor 420 adopts a parallel ball launch wheels 410 or the ball launch wheels 410 are installed horizontally compared to the FIG. 7.

Embodiment 4

Referring to the FIG. 1, FIG. 2 and FIG. 5, the present invention provides an automatic ball launcher for pets, which comprises:

a body shell 100, wherein an entrance for a ball 110 at a top end and an outlet for a ball 120 at a front end of the body shell 100; wherein a diameter of the entrance for the ball 110 is slightly bigger than the diameter of the ball, which allows the ball to fall down to the ball launch aisle 300 and be launched out through the ball launch mechanism 400 one by one; the ball is able to be a tennis ball, an EVA ball and ect., wherein the EVA ball has the following advantages compared to the tennis ball: the EVA ball with a surface without fibers has better bite, impact endurance and bounce, is easy to clean and less harmful for people and pets who carelessly hit by the ball.

a ball launch aisle 300 which is settled between the entrance for the ball 110 and the outlet for the ball 120 to connect the entrance for the ball 110 and the outlet for the ball 120; the ball stored in the ball storage basket 200 enters the ball launch aisle 300 through the entrance for the ball 110 and is launched out from the outlet for the ball 120 through the ball launch aisle 300;

a ball launch mechanism 400 which is connected to the ball launch aisle 300 and near the outlet for the ball 120; the ball launch mechanism 400 comprises one or more ball launch wheels 410 which are set on two sides of the ball launch aisle 300; a face of the ball launch wheels 410 is a concaved curve which matches an outline of the ball; the surface of the ball launch wheels 410 is arranged with regular teeth; the ball launch wheels 410 rotate to launch the ball from the outlet 120, which are driven by the one or more ball launch motors 401.

For convenient explanation, two ball launch wheels 410 are illustrated for successive description; the two ball launch wheels 410 are set on the two sides of the ball launch aisle respectively; the distance between the two ball launch wheels 410 is slightly smaller than the diameter of the ball; the size, shape and structure of the two ball launch wheels are same; the two ball launch wheels are set symmetrically on the two sides of the ball launch aisle 300; the distance between the two ball launch wheels 410 is slightly smaller than the diameter of the ball which enables the two ball launch wheels 410 to squeeze and launch out the ball when the ball enters the ball launch aisle and rolls to between the two ball launch wheels 410.

The above description illustrates that the face of the ball launch wheels 410 at the left and right sides of the ball launch aisle 300 is a concaved curve which matches the outline of the ball; the design significantly increases the contact surface between the ball and the ball launch wheels 410, which effectively solves the problem of saliva contaminated ball being easily stuck inside the ball launcher and guaranteed the launch distance and stability of the ball; the pet training efficiency is improved effectively.

Preferably, as in the FIG. 3 and FIG. 4, the ball launch wheels 410 comprise the wheel core 411 and the rubber wheel 412.

The ball launch wheels 410 of the embodiment of the present invention comprise a wheel core 411 and a rubber wheel 412; the wheel core 411 and the rubber wheel 412 are fixed together by fasteners or are integrally molded; the weight of the wheel is controlled by the rubber wheel 412 which effectively reduces the weight of the ball launch wheels 410.

As illustrated in FIG. 4, wheel core 411 comprises a bearing 4111, a silicone case 4112 with bulges which is worn on the bearing, a bottom shell 4113 which matches the silicone case 4113; a slot is set on the bottom shell 4113, which matches the silicone case 4112 with bulges; the silicone case 4112 is fixed in the bottom shell 4113.

A silicon case 4112 with bulges is worn on the bearing 4111 of the wheel core 411 to prevent the bearing 4111 outer ring from rotating and effectively reduce the noise and shake, which extends the service life of the ball launch motor of the ball launch wheels 410.

Preferably, a sensor 700 is set on one side of the ball launch aisle 300, wherein the sensor 700 (a Hall switch is set on the side of the ball launch aisle 300 with the outlet for ball) (not marked in the drawing) is electrically connected to the ball launch mechanism 400; the sensor 700 is for sending out signals to start the ball launch mechanism 400.

While switch on, the sensor 700 checks the ball when the ball falls into the ball launch aisle 300 from the entrance 110; the sensor 700 sends out the signals and starts the ball launch motor 401 of the ball launch mechanism 400 to rotate; When the ball falls down and rolls to the place near the outlet for the ball under gravity, the ball launch wheels 410 have already rotated to a certain speed, the ball is launched out from the outlet 120 by the two highly rotating ball launch wheels 410; another ball enters the ball launch aisle 300 from the entrance 110; repeat the procedure.

Preferably, the automatic ball launcher for pets of the embodiment of the present invention comprises a ball storage basket 200; the ball storage basket 200 is integrated on the top of the body shell 100 and connected to the entrance for ball 110; the ball storage basket 200 is for storing the ball such as tennis balls; the ball storage basket 200 is set above the entrance for the ball 110 to form a symmetrical funnel; the ball storage basket adopts the integral molding which is pressed on the machine core and is able to be assembled and disassembled easily; the appearance of the ball launcher is integral, which enhances the water-proof feature.

Preferably, as in FIG. 2, the automatic ball launcher for pets in the embodiment further comprises the control device 500; the ball launch mechanism 300 is connected to the control device 500; the control device 500 receives the signals from the sensor 700 and sends out signals to adjust the launch distance of the ball launch mechanism 400. The control device 500 is able to adjust the launch time and launch speed of the ball launch mechanism 400.

In the embodiment, the control device 500 comprises a control module built inside the body shell, a control panel 510 and a remote control device set outside the body shell 100 (not marked in the drawings).

The remote control device adopts a wireless infrared remote control, a wireless wifi remote control or a blue tooth remote control, which is able to be substituted with an intelligent mobile terminal such as a mobile phone or an ipad for convenient operation. The remote control device enables a remote operation on the automatic ball launcher for switch on and off while the user is training the pet; the automatic ball launcher for pets is able to be operated by using a remote control device at home or in the training field to switch on/off, control the launch time or launch distance of the ball.

Preferably, the control panel 510 comprises button 511 for a launch range selection, launch range indicators 512, a remote control sensor light 513, a launch indicator or button for launch speed.

The launch distance is the distance between the falling point and the ball launcher after the ball is being launched from the ball launcher. The button 511 for a launch range selection is set by a program to enable the user to select a needed launch distance range. The corresponding launch range indicators 512 is lit and at the same time the rotating speed of the launch motor 401 of the launch mechanism 400 is controlled to launch the ball to the needed launch distance.

The button 511 for a launch range selection is able to be real button or touch button.

The user is able to adjust the launch distance of the ball through the remote control device or the control panel 510. When the user uses the remote control device, the remote control sensor light 513 is lit; the remote control device sends out commands; the control module receives commands to control the rotation speed of the ball launch motor of the ball launch mechanism 400; the launch distance is adjusted.

Preferably, as in the FIG. 2 and FIG. 5, the automatic ball launcher for pets in the embodiment comprises a ball storage tank 800 set in the body shell 100; the tank door 810 of the ball storage tank 800 is on the back of the body shell 100.

The ball storage tank 800 is for storing the ball. When the automatic ball launcher is no longer used, the balls is able to be stored inside the ball storage tank 800 with the tank door 810 closed to prevent the ball from missing. When the ball launcher is in use, the balls are able to be taken out from the ball storage tank 800 for the user and the pet to play.

Preferably, the automatic ball launcher for pets in the embodiment also comprises the power interface 900A and the power switch or the battery set and the power switch. The power interface 900A, the battery set 900B and the power switch 900C are all electrically connected with the control device 500.

The automatic ball launcher for pets in the embodiment is able to use the external power supply such as the alternating current through the power interface 900A or use the built-in battery set 900B directly. The battery is able to be a storage battery or a chargeable Li-ion battery. The number of the battery is able to be one or many and the type of the battery depends on practical needs.

Preferably, the automatic ball launcher for pets in the embodiment comprises a human body sensor 150 on the front end of the body shell.

While the automatic ball launcher is working, if the pet or the user runs into the front of the ball launcher, the human body sensor 150 senses the signals and sends signals to the control device 500. The ball launch motor 401 of the ball launch mechanism 400 slows down or stops the rotation. The safe factor of the playing is guaranteed. Preferably, the human body sensor is able to be connected to the ball launcher through the USB interface and is able to be switch on/off arbitrarily, which is convenient for use.

Preferably, as shown in the FIG. 1 and FIG. 2, handles 130 are set on the left and right side of the body shell 100 in the embodiment. An angle rotator (not marked in the drawings) is set on the bottom of the body shell 100. The angle rotator is connected to the control device 500. The signals are input through the control panel 510 or the remote control device. The entrance for the ball 110 on the body shell 100 is in a basket shape with an outlet on the bottom, which is able to guarantee the integrity and good appearance. The body shell on the ball launch aisle 300 and the ball launch mechanism 400 part is divided into the left and the right part and is able to be integrated, which is convenient for assembly.

Preferably, the method of installing an angle sensor (not marked in the drawing), a drive wheel and a driven wheel which is set behind the drive wheel on the bottom of the body shell 100 is able to be adopted, wherein the drive wheel is connected to the wheel motor (set inside the body shell); the angle sensor and the wheel motor are connected to control device. The method is able to adjust the launch direction and launch angle of the automatic ball launcher and to move the automatic ball launcher.

The automatic ball launcher for pets of the present invention set handles 130 on the left and right side of the body shell 100 for transport. An angle rotator is set on the bottom of the body shell 100. The user is able to adjust the rotating direction and angle of the angle rotator through the remote control device or the control panel 510 to adjust the launch direction and the launch angle of the automatic ball launcher. When the user uses the remote control device, the remote control sensor light 513 is lit and the remote control device sends out the commands. The control device receives the commands and controls the angle rotator to rotate, which is able to control the rotating angle of the automatic launcher. The automatic ball launcher is able to be moved freely without much time and effort needed.

Embodiment 5

Figure 9:
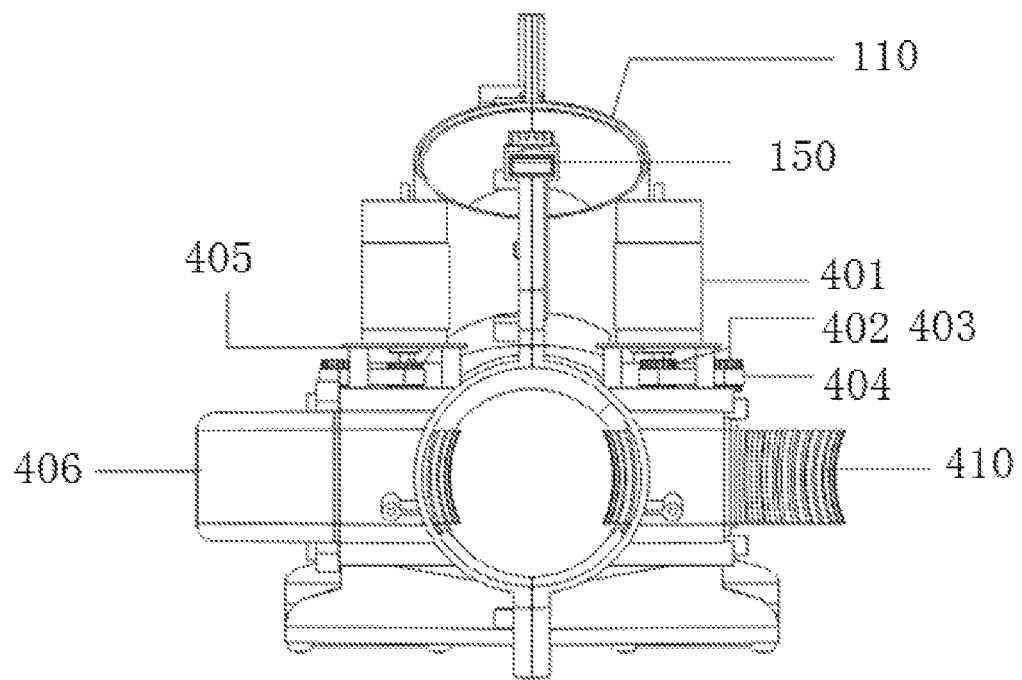
FIG. 9 is a local structure of the automatic ball launcher for pets in embodiment 5.

The present invention provides an automatic ball launcher for pets. Referring to FIG. 1, FIG. 2 and FIG. 9, the embodiment 5 is different with the embodiment 1 to 4 in that the ball launch motor 401 links with a synchronized drive belt pulley 402 through an axle; the synchronized drive belt pulley 402 links with a synchronized driven belt pulley 403 through a belt; the synchronized driven belt pulley 403 links with the ball launch wheel 410 through a bearing; preferably, the synchronized drive belt pulley 402 and the synchronized driven pulley 403 are on the same level. While assembly the launcher, setting the ball launch motor 401 on the fixed steel washer 405; press mounting the synchronized drive belt pulley 402 with a limit on both ends, the synchronized driven belt pulley 403 and the belt 404; keeping the synchronized drive belt pulley 402 and the synchronized driven belt pulley on the same level; mounting the tank cover 406 on a side of the ball launch wheel 410 to fix the position of the ball launch wheel 410. Fixing the ball launch motor 401, the ball launch wheel 410 by two limits; a position of the ball launch mechanism 400 is controllable which reduce the launch fault caused by the strong shake.

In the description, a lot of terminologies are adopted to describe the structure, such as "body shell", "ball launch aisle" and "ball launch mechanism". The terminologies are just for conveniently illustrating the essence of the invention not exclusive description of the structure. The terminologies are not an extra restriction on the present invention.

The embodiments above are just the optimal applications of the present invention which are not limitations on the present invention. For a skilled technician in the field, the present invention has many varieties and alterations. The modifications, substitutions and improvements within the principles and spirits of the present invention are all included within the protection range of the present invention.

What is claimed is:

1. An automatic ball launcher for pets, comprising:
a body shell, wherein an entrance for a ball is at a top end and an outlet for the ball is at a front end of the body shell;
a ball launch aisle which is disposed between the entrance for the ball and the outlet for the ball to connect the entrance for the ball and the outlet for the ball;
a ball launcher mechanism which is adjacent to the ball launch aisle and near the outlet for the ball; the ball launch mechanism comprising one or more ball launch wheels and one or more ball launch motors; the one or more ball launch wheels are disposed at one or more sides of the ball launch aisle; a face of the one or more ball launch wheels is a concave curve which matches an outline a curvature of the ball surface; wherein the ball launch wheels rotate to launch the ball from the outlet, which are driven by the one or more ball launch motors; and
a human body sensor for detecting humans, wherein the human body sensor is communicatively coupled to a control device, wherein the human body sensor is selectively disabled or enabled by a user.

2. The automatic ball launcher for the pets, as recited in claim 1, wherein the concave curve is formed by regularly arranged tapered teeth.

3. The automatic ball launcher for the pets, as recited in claim 1, further comprising a ball conveyor and a ball conveyor motor for driving the ball conveyor; the ball conveyor is driven by the ball conveyor motor to move the ball into the ball launch mechanism.

4. The automatic ball launcher for the pets, as recited in claim 3, wherein the ball conveyor comprises one or more blades; wherein a portion of the one or more blades move within the launch aisle through an opening in the ball launch aisle.

5. The automatic ball launcher for the pets, as recited in claim 3, wherein a sound proof pad is placed on a ball falling point in the ball launch aisle to catch the ball when the ball falls down from the entrance.

6. The automatic ball launcher for the pets, as recited in claim 4, wherein a portion of the ball launch aisle between the ball falling point and the ball launch wheels is tilted such that the ball increases in elevation as it passes from the ball falling point to the ball launch wheels.

7. The automatic ball launcher for the pets, as recited in claim 1, wherein a ball storage tank is set in the body shell, wherein the ball storage tank is not connected to the ball launch aisle and forms no part of the ball launch aisle; and wherein handles are set on a left and a right side of the body shell.

8. The automatic ball launcher for the pets, as recited in claim 6, wherein the ball conveyor is disposed lower in the shell than the ball launcher mechanism, such that the conveyor increases the elevation of the ball as the conveyor moves the ball to the ball launch mechanism.

9. The automatic ball launcher for the pets, as recited in claim 1, further comprising:
 a sensor disposed adjacent to the ball launch aisle and between the entrance of the ball launch aisle and the ball falling point, which detects the passage of the ball as it falls from the entrance of the ball launch aisle to the ball falling point, and which outputs a sensor signal when the passage of the ball occurs;
 a controller which receives the sensor signal and in response to receiving the sensor signal, enables the ball launch motors to rotate at rate corresponding to a launch speed, and enables a conveyor to move the ball into the ball launch mechanism after a launch time.

10. The automatic ball launcher for the pets, as recited in claim 9, where in the launch speed is user-selectable, and wherein the launch time is user-selectable.

11. The automatic ball launcher for the pets, as recited in claim 1, further comprising:
 a power interface;
 a built-in rechargeable battery, rechargeable via the power interface; and
 a controller, coupled to the power interface and battery;
  wherein the ball launcher selectively operates via power from the power interface or the built-in battery.

12. The automatic ball launcher for the pets, as recited in claim 6, wherein the portion of the ball launch aisle between the ball falling point and the ball launch wheels is tilted by an angle greater than 30 degrees.

13. The automatic ball launcher for the pets, as recited in claim 1, wherein a first angle of the ball launch wheels with respect to a bottom of the body shell, and a second angle of the launch wheels with respect to the opening of the ball launch aisle, are adjustable, thus allowing adjustment of a ball launch direction and a ball launch angle.

14. The automatic ball launcher for the pets, as recited in claim 10, wherein the controller receives a user selection of the launch speed and the launch time via wireless interface in communication with a remote control device or mobile terminal.

\* \* \* \* \*